(12) United States Patent
Li et al.

(10) Patent No.: US 10,484,209 B2
(45) Date of Patent: Nov. 19, 2019

(54) DATA TRANSMISSION METHOD AND DEVICE

(71) Applicant: ZTE CORPORATION, Shenzhen, Guangdong Province (CN)

(72) Inventors: Weimin Li, Shenzhen (CN); Zhifeng Yuan, Shenzhen (CN)

(73) Assignee: ZTE CORPORATION, Shenzhen, Guangdong Province (CN)

(*) Notice: Subject to any disclaimer, the term of this patent is extended or adjusted under 35 U.S.C. 154(b) by 0 days.

(21) Appl. No.: 15/560,491

(22) PCT Filed: Jan. 14, 2016

(86) PCT No.: PCT/CN2016/070886
§ 371 (c)(1),
(2) Date: Sep. 22, 2017

(87) PCT Pub. No.: WO2016/150241
PCT Pub. Date: Sep. 29, 2016

(65) Prior Publication Data
US 2018/0062884 A1    Mar. 1, 2018

(30) Foreign Application Priority Data
Mar. 24, 2015 (CN) .......................... 2015 1 0131525

(51) Int. Cl.
*H04L 25/03* (2006.01)
*H04B 1/707* (2011.01)
(Continued)

(52) U.S. Cl.
CPC ............. *H04L 25/03* (2013.01); *H04B 1/707* (2013.01); *H04J 13/10* (2013.01); *H04J 13/16* (2013.01)

(58) Field of Classification Search
CPC ................................ H04L 25/03; H04J 13/10
See application file for complete search history.

(56) References Cited

U.S. PATENT DOCUMENTS

| 5,555,268 A | 9/1996 | Fattouche et al. |
| 6,188,717 B1 | 2/2001 | Kaiser et al. |
| (Continued) | | |

FOREIGN PATENT DOCUMENTS

| CN | 1258176 A | 6/2000 |
| CN | 101192877 A | 6/2008 |
| (Continued) | | |

OTHER PUBLICATIONS

Ying Zhao et al., Complex Orthogonal Spreading Sequences Using Mutually Orthogonal Complementary Sets, International Conference on Microwaves, Radar & Wireless Communications, 2006, p. 622-625.

*Primary Examiner* — Sam K Ahn
*Assistant Examiner* — Amneet Singh
(74) *Attorney, Agent, or Firm* — Cantor Colburn LLP

(57) ABSTRACT

This document discloses a data transmission method and apparatus. The method includes: obtaining N data symbols to be sent; determining N complex sequences to be used; processing the N data symbols using the N complex sequences respectively to generate N data symbol sequences; superimposing the N data symbol sequences to generate a superimposed data symbol sequence; and sending the superimposed data symbol sequence; where N is an integer number greater than or equal to 2.

13 Claims, 4 Drawing Sheets

(51) Int. Cl.
*H04J 13/10* (2011.01)
*H04J 13/16* (2011.01)

(56) References Cited

U.S. PATENT DOCUMENTS

| | | | |
|---|---|---|---|
| 6,707,788 B1* | 3/2004 | Kim | H04B 1/707 370/203 |
| 2004/0032838 A1* | 2/2004 | Min | H04J 13/0048 13/48 |
| 2007/0194924 A1* | 8/2007 | Karr | G01S 13/765 340/572.1 |
| 2009/0323642 A1* | 12/2009 | Tanno | H04B 1/7075 370/336 |
| 2012/0027126 A1* | 2/2012 | Park | H04L 27/2604 375/298 |
| 2012/0082023 A1 | 4/2012 | Higuchi et al. | |
| 2016/0269214 A1* | 9/2016 | Popovic | H04L 1/006 |

FOREIGN PATENT DOCUMENTS

| CN | 101420409 A | 4/2009 |
|---|---|---|
| CN | 101567865 A | 10/2009 |
| CN | 102246485 A | 11/2011 |
| CN | 102655420 A | 9/2012 |

\* cited by examiner

DATA TRANSMISSION METHOD AND DEVICE

TECHNICAL FIELD

The present application relates to, but is not limited to, wireless communication technologies.

BACKGROUND

Uplink multi-user access communication can be implemented by different multiple access technologies, such as Time Division Multiple Access (TDMA), Frequency Division Multiple Access (FDMA), Code Division Multiple Access (CDMA) and Space Division Multiple Access (SDMA). Excellent access performance can be provided by using the CDMA technology to implement the uplink multi-user access communication, and the CDMA technology has been used by multiple wireless communication standards.

For an access process using the CDMA technology, multiple access terminals firstly use, respectively, a spreading sequence of a certain length (e.g., a spreading sequence of a length L consisted of L elements, herein the elements may be numerical symbols) to spread data symbols obtained by modulating data to be sent in an amplitude and phase modulation (such as Quadrature Amplitude Modulation (QAM)) mode. The spreading refers to a process in which each of the modulated data symbols is multiplied by each element of the spreading sequence to form a data symbol sequence with the same length as that of the spreading sequence used. In this process, each of the modulated data symbols (e.g., constellation point symbols corresponding to the data to be sent which has been modulated in the QAM mode) is multiplied by each symbol of the spreading sequence of the length L, such that each of the modulated data symbols is spread to be a data symbol sequence with the same length as that of the spreading sequence used, i.e., each of the modulated data symbols will be spread to be L symbols, which is equivalent to the case in which each of the modulated data symbols is carried by the spreading sequence of the length L, respectively. Then, the data symbol sequences, obtained after spreading process, of the multiple access terminals may be sent on the same time-frequency resources. Finally, after wireless propagation of the spread signals of the multiple access terminals, a base station receives a superimposed signal, and the base station can separate useful information of each of the terminals from the received superimposed signal through the multi-user reception and detection technology.

The CDMA belongs to the category of spread spectrum communication. Because the data symbols modulated by the terminals will be spread to be L symbols after being spread using a spreading sequence of the length L, if transmission time of the L spread symbols is to be equal to transmission time of the data symbols prior to the spreading, then the bandwidth for transmitting the L spread symbols is spread by a factor of L, thus a spreading sequence is often called a spread spectrum sequence.

The spread symbols of the access terminals may be transmitted through the multi-carrier technology (such as Orthogonal Frequency Division Multiplexing (OFDM) and Filter-Bank Multi-Carrier (FBMC)). Combination of the code division multiple access with the multi-carrier technology is the Multi Carrier-Code Division Multiple Access (MC-CDMA) technology.

In the CDMA technology, the spreading process of a transmitter is relatively simple: each modulated data symbol is multiplied by each symbol of a spreading sequence of the length L to obtain the L spread symbols, and then the L spread symbols are transmitted through the single-carrier technology or the multi-carrier technology; while a receiving process of a base station receiver is relatively complicated. How does the base station receiver separate the useful data information of each of the terminals from the superimposed signal accurately to ensure the multiple access performance of CDMA system is the key to the CDMA system. This involves two aspects, a spreading sequence and a receiver, herein selection of a spreading sequence is performance basis and the design of the receiver is performance assurance.

In order to acquire the excellent multiple access performance, a good cross-correlation is needed between the spreading sequences used by different terminals. If the single-carrier code division multiplexing technology is used, then the spreading sequences used by the terminals further need to have a good auto-correlation to confront the impact of multipath delay spread. While the multi-carrier code division multiplexing technology can rely on the multi-carrier technology to confront the impact of the multipath delay spread, and the design of the spreading sequence may consider emphatically the cross-correlation properties which is propitious for separation of multi-user information by the receiver.

On the basis of the design of a spreading sequence, the base station can separate the multi-user information using the multi-user reception and detection technology with high performance, such as the successive interference cancellation (SIC) reception and detection technology, the complexity of which, however, is relatively high, to obtain the excellent multiple access performance.

The selection and design of a spreading sequence is an important aspect of CDMA technology. Direct Sequence-Code Division Multiple Access (DS-CDMA) technology, which is a commonly-used technology in the CDMA technology, has been used as the uplink multi-user access technology for multiple wireless communication standards and systems. Its spreading sequence is a simple binary pseudo-noise (PN) real sequence. Moreover, the DS-CDMA based on a binary pseudo-noise real sequence is applied to the MC-CDMA technology as well. The binary pseudo-noise real sequence can also be called a binary pseudo-noise sequence, a value of each element or symbol of which is typically represented as 0 or 1 or as a bipolar sequence. That is, 0 is represented as +1 and 1 is represented as −1, or 0 is represented as −1 and 1 is represented as +1.

The design of a spreading sequence further needs to consider the length of the spreading sequence. The longer the spreading sequence, the more easier it will be to ensure low cross-correlation between the spreading sequences used by different access terminals, and the more easier it will be to select more sequences with low cross-correlation, thereby supporting simultaneous access of more terminals. If the number of the terminals having access to the system simultaneously is greater than the length of the spreading sequence, then it is believed that the system is in an overload status.

Supporting simultaneous access of a large number of users to the system for communication is an important requirement for the future wireless communication, which may be implemented by designing a multi-user access communication system with better overload capability based on the code division multiple access. Decreasing communication delay is another important requirement for the future wireless communication, which may be implemented by designing a multi-user access communication system with grant-free access characteristic based on the code division multiple access.

From the perspective of multi-user information theory, using a non-orthogonal multiple access mode in the uplink can obtain a greater system capacity or marginal throughput than using an orthogonal multiple access mode. Therefore, in order to provide a flexible system design and support simultaneous access of more users, different access terminals can use non-orthogonal spreading sequences. Since the spreading sequences of the different access terminals are not orthogonal to each other, the reception and detection performance of each of the terminals will become worse as the number of the terminals having access to the system simultaneously increases. When the system overloads, interference between multiple users will become more serious.

In the existing technology, the code division multiple access (CDMA) technology uses a spreading sequence based on a binary pseudo-noise real sequence, the length of which is relatively long. Thus, when a large number of user terminals have access to the system or when the system overloads, the performance will become worse when a traditional receiver (such as a RAKE receiver) is used. While the reception and detection complexity will be very high and the delay will be large when an interference cancellation receiver (such as a receiver using the SIC technology) is used. If a binary pseudo-noise real sequence of a shorter length is used, then low cross-correlation between the sequences cannot be guaranteed. When a large number of user terminals have access to the system or when the system overloads, serious interference between multiple users will be caused, further influencing the multi-user reception and detection performance and multi-user access communication performance.

SUMMARY

The following is a summary of the subject matter described herein in detail. This summary is not intended to limit the protection scope of claims.

Embodiments of the present disclosure provides a data transmission method and apparatus to solve the problem existing in the existing technology that the interference between multiple users is serious and the reception and detection complexity is high, thereby influencing the multi-user reception and detection performance and multi-user access communication performance.

An embodiment of the present disclosure provides a data transmission method, including:

obtaining N data symbols to be sent;

determining N complex sequences to be used;

processing the N data symbols using the N complex sequences respectively to generate N data symbol sequences;

superimposing the N data symbol sequences to generate a superimposed data symbol sequence; and sending the superimposed data symbol sequence;

where N is an integer number greater than or equal to 2.

In an exemplary embodiment, obtaining the N data symbols to be sent includes:

using N data symbols obtained by performing a first preset processing on X data bits as the N data symbols to be sent; or using real part data and imaginary part data of Y data symbols obtained by performing a second preset processing on the X data bits as the N data symbols to be sent, where N=2Y, and Y is an integer number greater than or equal to 1;

where X is an integer number greater than or equal to N.

In an exemplary embodiment, the first preset processing or the second preset processing includes:

mapping according to a predefined mapping rule; or amplitude and/or phase modulation; or using every k data bits as one data symbol, where k is an integer number greater than or equal to 1.

In an exemplary embodiment, the N complex sequences are:

N complex sequences orthogonal to each other; or N non-orthogonal complex sequences.

In an exemplary embodiment, a length of the complex sequence is L, each element of the complex sequence is a complex number, and values of both a real part and an imaginary part of each element of the complex sequence come from an M-ary set of real numbers, where L is an integer number greater than 1 and M is an integer number greater than or equal to 2.

In an exemplary embodiment, the M-ary set of real numbers includes:

a set consisted of M integer numbers within a range $[-(M-1)/2, (M-1)/2]$ when M is an odd number greater than 2; or a set consisted of M odd numbers within a range $[-(M-1), (M-1)]$ when M is an even number greater than or equal to 2; or a set consisted of M real numbers obtained by multiplying M integer numbers within a range $[-(M-1)/2, (M-1)/2]$ by a first preset coefficient respectively when M is an odd number greater than 2; or a set consisted of M real numbers obtained by multiplying M odd numbers within a range $[-(M-1), (M-1)]$ by a second preset coefficient respectively when M is an even number greater than or equal to 2.

In an exemplary embodiment, determining the N complex sequences to be used includes:

determining the N complex sequences to be used according to a fixed configuration of a system; or determining the N complex sequences to be used by using a manner of randomly generating; or determining the N complex sequences to be used according to signaling sent by a system; or determining the N complex sequences to be used according to identification information of a transmitter; or determining the N complex sequences to be used according to data transmission resources; or determining the N complex sequences to be used from a preset set of complex sequences according to the fixed configuration of the system; or determining the N complex sequences to be used from the preset set of complex sequences by using a manner of randomly selecting; or determining the N complex sequences to be used from the preset set of complex sequences according to the signaling sent by the system; or determining the N complex sequences to be used from the preset set of complex sequences according to the identification information of the transmitter; or determining the N complex sequences to be used from the preset set of complex sequences according to the N data symbols; or determining the N complex sequences to be used from the preset set of complex sequences according to the data transmission resources.

In an exemplary embodiment, the preset set of complex sequences is determined according to the fixed configuration of the system; or the preset set of complex sequences is determined according to the signaling sent by the system; or the preset set of complex sequences is determined from Q sets of complex sequences according to the fixed configuration of the system; or the preset set of complex sequences is determined from the Q sets of complex sequences according to the signaling sent by the system; or the preset set of complex sequences is determined from the Q sets of complex sequences according to the identification information of the transmitter; or the preset set of complex sequences is determined from the Q sets of complex sequences according to the data transmission resources; where Q is an integer number not less than 1.

In an exemplary embodiment, the identification information of the transmitter includes at least one of the following: a serial number of the transmitter, an identification code of the transmitter, position information of the transmitter and a network address of the transmitter.

In an exemplary embodiment, processing the N data symbols using the N complex sequences respectively includes:

spreading the N data symbols using corresponding complex sequences in the N complex sequences respectively; or mapping the N data symbols as the corresponding complex sequences in the N complex sequences respectively.

In an exemplary embodiment, superimposing the N data symbol sequences includes:

adding up the N data symbol sequences or performing preset processing on the N data symbol sequences respectively and then adding up the processed N data symbol sequences; or obtaining multiple data symbol sequence groups according to the N data symbol sequences, herein each of the data symbol sequence groups contains at least two data symbol sequences; and adding up the at least two data symbol sequences in each of the data symbol sequence groups or performing the preset processing on the at least two data symbol sequences in each of the data symbol sequence groups respectively and then adding up the processed at least two data symbol sequences.

In an exemplary embodiment, the preset processing includes power adjustment, amplitude adjustment, phase rotation or delay processing.

In an exemplary embodiment, sending the superimposed data symbol sequence includes:

forming and sending transmitting signals on the data transmission resources for the superimposed data symbol sequence.

An embodiment of the present disclosure further provides a data transmission apparatus, including:

an obtaining module configured to obtain N data symbols to be sent;

a determination module configured to determine N complex sequences to be used;

a first processing module configured to process the N data symbols obtained by the obtaining module using the N complex sequences determined by the determination module respectively, to generate N data symbol sequences;

a second processing module configured to superimpose the N data symbol sequences generated by the first processing module to generate a superimposed data symbol sequence; and a sending module configured to send the superimposed data symbol sequence generated by the second processing module;

where N is an integer number greater than or equal to 2.

In an exemplary embodiment, the obtaining module is configured to:

use N data symbols obtained by performing a first preset processing on X data bits as the N data symbols to be sent; or use real part data and imaginary part data of Y data symbols obtained by performing a second preset processing on the X data bits as the N data symbols to be sent, where N=2Y, and Y is an integer number greater than or equal to 1;

where X is an integer number greater than or equal to N.

In an exemplary embodiment, the N complex sequences are:

N complex sequences orthogonal to each other; or N non-orthogonal complex sequences.

In an exemplary embodiment, a length of the complex sequence is L, each element of the complex sequence is a complex number, and values of both a real part and an imaginary part of each element of the complex sequence come from an M-ary set of real numbers, where L is an integer number greater than 1 and M is an integer number greater than or equal to 2.

In an exemplary embodiment, the M-ary set of real numbers includes:

a set consisted of M integer numbers within a range $[-(M-1)/2, (M-1)/2]$ when M is an odd number greater than 2; or a set consisted of M odd numbers within a range $[-(M-1), (M-1)]$ when M is an even number greater than or equal to 2; or a set consisted of M real numbers obtained by multiplying M integer numbers within a range $[-(M-1)/2, (M-1)/2]$ by a first preset coefficient respectively when M is an odd number greater than 2; or a set consisted of M real numbers obtained by multiplying M odd numbers within a range $[-(M-1), (M-1)]$ by a second preset coefficient respectively when M is an even number greater than or equal to 2.

In an exemplary embodiment, the determination module is configured to:

determine the N complex sequences to be used according to a fixed configuration of a system; or determine the N complex sequences to be used by using a manner of randomly generating; or determine the N complex sequences to be used according to signaling sent by a system; or determine the N complex sequences to be used according to identification information of a transmitter; or determine the N complex sequences to be used according to data transmission resources; or determine the N complex sequences to be used from a preset set of complex sequences according to the fixed configuration of the system; or determine the N complex sequences to be used from the preset set of complex sequences by using a manner of randomly selecting; or determine the N complex sequences to be used from the preset set of complex sequences according to the signaling sent by the system; or determine the N complex sequences to be used from the preset set of complex sequences according to the identification information of the transmitter; or determine the N complex sequences to be used from the preset set of complex sequences according to the N data symbols; or determine the N complex sequences to be used from the preset set of complex sequences according to the data transmission resources.

In an exemplary embodiment, the preset set of complex sequences is determined according to the fixed configuration of the system; or the preset set of complex sequences is determined according to the signaling sent by the system; or the preset set of complex sequences is determined from Q sets of complex sequences according to the fixed configuration of the system; or the preset set of complex sequences is determined from the Q sets of complex sequences according to the signaling sent by the system; or the preset set of complex sequences is determined from the Q sets of complex sequences according to the identification information of the transmitter; or the preset set of complex sequences is determined from the Q sets of complex sequences according to the data transmission resources; where Q is an integer number not less than 1.

In an exemplary embodiment, the identification information of the transmitter includes at least one of the following: a serial number of the transmitter, an identification code of the transmitter, position information of the transmitter, and a network address of the transmitter.

In an exemplary embodiment, the first processing module is configured to:

spread the N data symbols using corresponding complex sequences in the N complex sequences respectively; or map the N data symbols as the corresponding complex sequences in the N complex sequences respectively.

In an exemplary embodiment, the second processing module is configured to:

add up the N data symbol sequences or performing preset processing on the N data symbol sequences respectively and then adding up the processed N data symbol sequences; or obtain multiple data symbol sequence groups according to the N data symbol sequences, herein each of the data symbol sequence groups contains at least two data symbol sequences, and add up the at least two data symbol sequences in each of the data symbol sequence groups or perform the preset processing on the at least two data symbol sequences in each of the data symbol sequence groups respectively and then adding up the processed at least two data symbol sequences.

In an exemplary embodiment, the sending module is configured to:

form and send transmitting signals on the data transmission resources for the superimposed data symbol sequence.

A computer readable storage medium has computer executable instructions stored therein used for carry out the method described above.

In the data transmission method and apparatus provided by the embodiments of the present disclosure, N data symbols to be sent are obtained, N complex sequences to be used are determined, the N data symbols are processed using the N complex sequences respectively to generate N data symbol sequences, the N data symbol sequences are superimposed to generate a superimposed data symbol sequence, and the superimposed data symbol sequence is sent, where N is an integer number greater than or equal to 2. Compared with the existing technology, the embodiments of the present disclosure can use complex sequences of shorter length to control efficiently the reception and detection complex of the receiver and interference between multiple users, thereby improving efficiently the multi-user access communication performance and implementing multi-user overload access communication and/or multi-user grant-free access communication.

After the accompanying drawings and detailed description are read and understood, other aspects can be understood.

DETAILED DESCRIPTION

Embodiments of the present disclosure will be described in detail below in conjunction with the accompanying drawings. It is should be noted that the embodiments in the present application and features in the embodiments can be combined with each other arbitrarily without conflict.

Steps shown in the flow chart of the accompanying figure can be executed in a computer system, such as a set of computer executable instructions. Moreover, although a logical order is shown in the flow chart, in some cases, the steps shown or described can be executed in an order different from the order here.

A system described in the embodiments of the present disclosure is a data transmission transceiver system including a transmitter, a receiver and related function nodes. The transmitter may be a terminal transmitter, a base station transmitter or other types of transmitters, the receiver may be a base station receiver, a terminal receiver or other types of receivers, and the related function nodes may be a network management unit, an operation and maintenance unit, etc. The description or operation associated with the system in the embodiments of the present disclosure may be implemented by a terminal or by a base station or by other types of transmitters or receivers or by the related function node, the embodiments of the present disclosure are not limited thereto. In addition, "include" used in the embodiments of the present disclosure should be understood as "include, but is not limited to".

Figure 1:
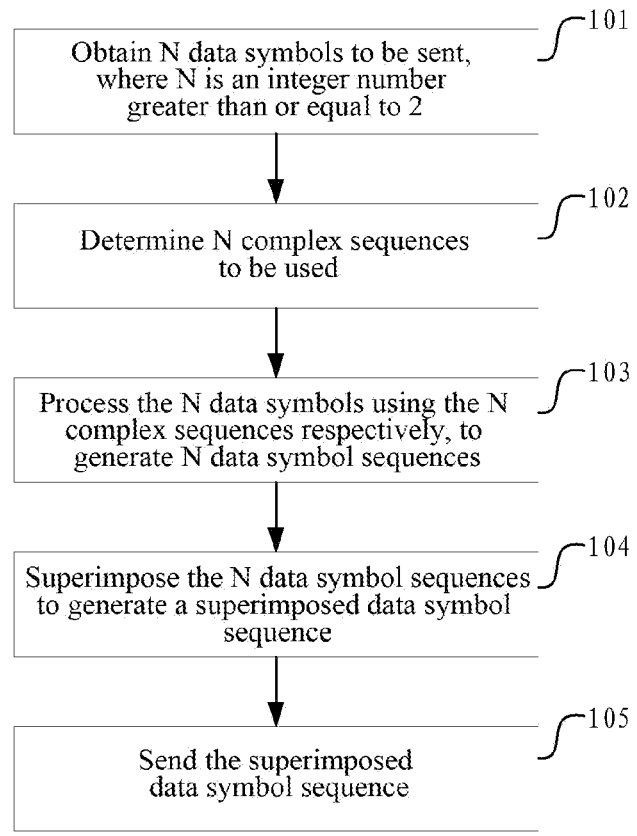
FIG. 1 is a flow chart of a data transmission method in accordance with an embodiment of the present disclosure.

A data transmission method provided in an embodiment of the present disclosure is applied in the transmitter and, as shown in FIG. 1, includes the following steps 101-105.

In Step 101, N data symbols to be sent are obtained, where N is an integer number greater than or equal to 2;

In Step 102, N complex sequences to be used are determined;

In Step 103, the N data symbols are processed using the N complex sequences respectively to generate N data symbol sequences;

In Step 104, the N data symbol sequences are superimposed to generate a superimposed data symbol sequence; and In Step 105, the superimposed data symbol sequence is sent.

In an implementation mode, for step 101, obtaining the N data symbols to be sent may include:

(1) using N data symbols obtained by performing a first preset processing on X data bits as the N data symbols to be sent; or (2) using real part data and imaginary part data of Y data symbols obtained by performing a second preset processing on the X data bits as the N data symbols to be sent, where N=2Y, and Y is an integer number greater than or equal to 1;

where X is an integer number greater than or equal to N.

In an implementation mode, the first preset processing or the second preset processing described above may include:

(1) mapping according to a predefined mapping rule; or (2) amplitude and/or phase modulation; or (3) using every k data bits as one data symbol, where k is an integer number greater than or equal to 1.

It should be noted that the terms "first" and "second" are only used for the purpose of convenience of expression, and there is no limitation in the order.

In an implementation mode, the N complex sequences in step 102 are: N complex sequences orthogonal to each other; or N non-orthogonal complex sequences.

In an implementation mode, a length of the above complex sequence is L, each element of the complex sequence is a complex number, and values of both a real part and an imaginary part of each element of the complex sequence come from an M-ary set of real numbers, where L is an integer number greater than 1 and M is an integer number greater than or equal to 2.

In an implementation mode, the M-ary set of real numbers described above includes:

a set consisted of M integer numbers within a range $[-(M-1)/2, (M-1)/2]$ when M is an odd number greater than 2; or a set consisted of M odd numbers within a range $[-(M-1), (M-1)]$ when M is an even number greater than or equal to 2; or a set consisted of M real numbers obtained by multiplying M integer numbers within a range $[-(M-1)/2, (M-1)/2]$ by a first preset coefficient respectively when M is an odd number greater than 2; or a set consisted of M real numbers obtained by multiplying M odd numbers within a range $[-(M-1), (M-1)]$ by a second preset coefficient respectively when M is an even number greater than or equal to 2.

It should be noted that the terms "first" and "second" are only used for the purpose of convenience of expression, and there is no limitation in the order. The first preset coefficient may be the same as or different from the second preset coefficient. Both the first preset coefficient and the second preset coefficient may be used for achieving energy normalization effect of the complex sequences.

In an implementation mode, for step 102, determining the N complex sequences to be used may include:

(1) determining the N complex sequences to be used according to a fixed configuration of a system; or (2) determining the N complex sequences to be used by using a manner of randomly generating; or (3) determining the N complex sequences to be used according to signaling sent by a system; or (4) determining the N complex sequences to be used according to identification information of a transmitter; or (5) determining the N complex sequences to be used according to data transmission resources; or (6) determining the N complex sequences to be used from a preset set of complex sequences according to the fixed configuration of the system; or (7) determining the N complex sequences to be used from the preset set of complex sequences by using a manner of randomly selecting; or (8) determining the N complex sequences to be used from the preset set of complex sequences according to the signaling sent by the system; or (9) determining the N complex sequences to be used from the preset set of complex sequences according to the identification information of the transmitter; or

(10) determining the N complex sequences to be used from the preset set of complex sequences according to the N data symbols; or

(11) determining the N complex sequences to be used from the preset set of complex sequences according to the data transmission resources.

In an implementation mode, the preset set of complex sequences is determined according to the fixed configuration of the system; or the preset set of complex sequences is determined according to the signaling sent by the system; or the preset set of complex sequences is determined from Q sets of complex sequences according to the fixed configuration of the system; or the preset set of complex sequences is determined from the Q sets of complex sequences according to the signaling sent by the system; or the preset set of complex sequences is determined from the Q sets of complex sequences according to the identification information of the transmitter; or the preset set of complex sequences is determined from the Q sets of complex sequences according to the data transmission resources; where Q is an integer number not less than 1.

In an implementation mode, the identification information of the transmitter may include at least one of the following: a serial number of the transmitter, an identification code of the transmitter, a position of the transmitter and a network address of the transmitter.

It should be noted that the position of the transmitter may be information of geographical coordinates where the transmitter is located, such as longitude and latitude coordinates, and the network address of the transmitter may be an internet protocol (IP) address or medium access control (MAC) address in the network.

In an implementation mode, for step 103, processing the N data symbols using the N complex sequences respectively to generate N data symbol sequences may include:

(1) spreading the N data symbols using corresponding complex sequences in the N complex sequences respectively, to generate the N data symbol sequences; or (2) mapping the N data symbols as the corresponding complex sequences in the N complex sequences respectively, to generate N data symbol sequences.

The spreading refers to a process in which each of the data symbols is multiplied by each element (complex symbol) of the corresponding complex sequence to form a data symbol sequence with the same length as that of the complex sequence.

In an implementation mode, for the step 104, superimposing the N data symbol sequences may include:

(1) adding up the N data symbol sequences or performing preset processing on the N data symbol sequences respectively and then adding up the processed N data symbol sequences; or (2) obtaining multiple data symbol sequence groups according to the N data symbol sequences, herein each of the data symbol sequence groups contains at least two data symbol sequences; and adding up the at least two data symbol sequences in each of the data symbol sequence groups or performing the preset processing on the at least two data symbol sequences in each of the data symbol sequence groups respectively and then adding up the processed at least two data symbol sequences.

In an implementation mode, the preset processing includes power adjustment, amplitude adjustment, phase rotation or delay processing.

In an implementation mode, for step 105, sending the superimposed data symbol sequence may include:

forming and sending transmitting signals on the data transmission resources for the superimposed data symbol sequence.

Finally, it should be noted that the steps of the data transmission method provided by the embodiment of the present disclosure are not necessarily have a strict ordering relationship. For example, in one possible case, the transmitter may determine first the complex sequences to be used, i.e., step 102 is executed first. Or in another possible case, the transmitter determine the complex sequences to be used, i.e., step 102 may be executed only once in the process that the transmitter transmits the data.

In the data transmission method provided by the embodiment of the present disclosure, N data symbols to be sent are obtained, N complex sequences to be used are determined, the N data symbols are processed using the N complex sequences respectively to generate N data symbol sequences, the N data symbol sequences are superimposed to generate the superimposed data symbol sequences, and the superimposed data symbol sequences are sent, where N is an integer number greater than or equal to 2. Compared with the existing technology, the embodiment of the present disclosure can use complex sequences of shorter length to control efficiently the reception and detection complex of the receiver and interference between multiple users, thereby improving efficiently the multi-user access communication performance and implementing multi-user overload access communication and/or multi-user grant-free access communication.

An embodiment of the present disclosure further provides a data transmission apparatus 10 provided in the transmitter described in the embodiment of the present disclosure, which may be a terminal transmitter, a base station transmitter or other types of transmitters, the embodiment of the present disclosure is not limited thereto.

Figure 2:
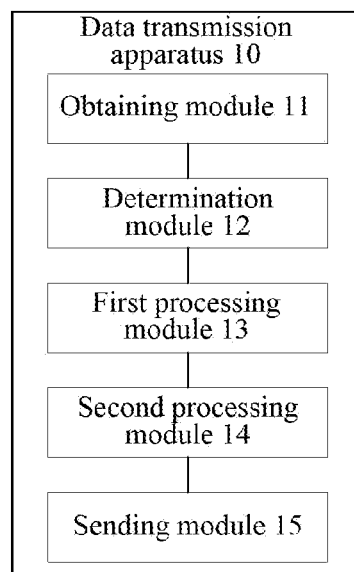
FIG. 2 is a block diagram of a data transmission apparatus in accordance with an embodiment of the present disclosure.

As shown in FIG. 2, the data transmission apparatus 10 includes an obtaining module 11, a determination module 12, a first processing module 13, a second processing module 14, and a sending module 15.

The obtaining module 11 is configured to obtain N data symbols to be sent, where N is an integer number greater than or equal to 2.

The determination module 12 is configured to determine N complex sequences to be used.

The first processing module 13 is configured to process the N data symbols obtained by the obtaining module 11 using the N complex sequences determined by the determination module 12 respectively, to generate N data symbol sequences.

The second processing module 14 is configured to superimpose the N data symbol sequences generated by the first processing module 13 to generate a superimposed data symbol sequence.

The sending module 15 is configured to send the superimposed data symbol sequence generated by the second processing module 14.

In an implementation mode, the obtaining module 11 is configured to:

use N data symbols obtained by performing a first preset processing on X data bits as the N data symbols to be sent; or use real part data and imaginary part data of Y data symbols obtained by performing a second preset processing on the X data bits as the N data symbols to be sent, where N=2Y, and Y is an integer number greater than or equal to 1;

where X is an integer number greater than or equal to N.

In an implementation mode, the obtaining module 11 performing the first preset processing on the X data bits or the obtaining module 11 performing the second preset processing on the X data bits may means that:

the obtaining module 11 performs mapping according to a predefined mapping rule; or the obtaining module 11 performs amplitude and/or phase modulation; or the obtaining module 11 uses every k data bits as one data symbol, where k is an integer number greater than or equal to 1.

In an implementation mode, the N complex sequences are:

N complex sequences orthogonal to each other; or N non-orthogonal complex sequences.

In an implementation mode, a length of the complex sequence is L, each element of the complex sequence is a complex number, and values of both a real part and an imaginary part of each element of the complex sequence come from an M-ary set of real numbers, where L is an integer number greater than 1 and M is an integer number greater than or equal to 2.

In an implementation mode, the M-ary set of real numbers includes:

a set consisted of M integer numbers within a range $[-(M-1)/2, (M-1)/2]$ when M is an odd number greater than 2; or a set consisted of M odd numbers within a range $[-(M-1), (M-1)]$ when M is an even number greater than or equal to 2; or a set consisted of M real numbers obtained by multiplying M integer numbers within a range $[-(M-1)/2, (M-1)/2]$ by a first preset coefficient respectively when M is an odd number greater than 2; or a set consisted of M real numbers obtained by multiplying M odd numbers within a range $[-(M-1), (M-1)]$ by a second preset coefficient respectively when M is an even number greater than or equal to 2.

In an implementation mode, the determination module 12 is configured to:

(1) determine the N complex sequences to be used according to a fixed configuration of a system; or (2) determine the N complex sequences to be used by using a manner of randomly generating; or (3) determine the N complex sequences to be used according to signaling sent by a system; or (4) determine the N complex sequences to be used according to identification information of a transmitter; or (5) determine the N complex sequences to be used according to data transmission resources; or (6) determine the N complex sequences to be used from a preset set of complex sequences according to the fixed configuration of the system; or (7) determine the N complex sequences to be used from the preset set of complex sequences by using a manner of randomly selecting; or (8) determine the N complex sequences to be used from the preset set of complex sequences according to the signaling sent by the system; or (9) determine the N complex sequences to be used from the preset set of complex sequences according to the identification information of the transmitter; or

(10) determine the N complex sequences to be used from the preset set of complex sequences according to the N data symbols; or

(11) determine the N complex sequences to be used from the preset set of complex sequences according to the data transmission resources.

In an implementation mode, the preset set of complex sequences is determined according to the fixed configuration of the system; or the preset set of complex sequences is determined according to the signaling sent by the system; or the preset set of complex sequences is determined from Q sets of complex sequences according to the fixed configuration of the system; or the preset set of complex sequences is determined from the Q sets of complex sequences according to the signaling sent by the system; or the preset set of complex sequences is determined from the Q sets of complex sequences according to the identification information of the transmitter; or the preset set of complex sequences is determined from the Q sets of complex sequences according to the data transmission resources; where Q is an integer number not less than 1.

In an implementation mode, the identification information of the transmitter includes at least one of the following: a serial number of the transmitter, an identification code of the transmitter, position information of the transmitter, and a network address of the transmitter.

In an implementation mode, the first processing module 13 is configured to:

spread the N data symbols using corresponding complex sequences in the N complex sequences respectively, to generate the N data symbol sequences; or map the N data symbols as the corresponding complex sequences in the N complex sequences respectively, to generate the N data symbol sequences.

In an implementation mode, the second processing module 14 is configured to:

add up the N data symbol sequences or perform preset processing on the N data symbol sequences respectively and then add up the processed N data symbol sequences; or obtain multiple data symbol sequence groups according to the N data symbol sequences, herein each of the data symbol sequence groups contains at least two data symbol sequences; and add up the at least two data symbol sequences in each of the data symbol sequence groups or perform the preset processing on the at least two data symbol sequences in each of the data symbol sequence groups respectively and then add up the processed at least two data symbol sequences.

In an implementation mode, the preset processing described above includes power adjustment, amplitude adjustment, phase rotation or delay processing.

In an implementation mode, the sending module 15 is configured to:

form and send transmitting signals on the data transmission resources for the superimposed data symbol sequence.

This embodiment is used for implementing the method embodiment described above, and the work procedure and work principle of the modules in this embodiment are similar to the description in the method embodiment and will not be repeated herein.

In the data transmission apparatus provided by the embodiment of the present disclosure, N data symbols to be sent are obtained, N complex sequences to be used are determined, the N data symbols are processed using the N complex sequences respectively, to generate N data symbol sequences, the N data symbol sequences are superimposed to generate a superimposed data symbol sequence, and the superimposed data symbol sequence is sent, where N is an integer number greater than or equal to 2. Compared with the existing technology, the embodiment of the present disclosure can use complex sequences of shorter length to control efficiently the reception and detection complex of the receiver and interference between multiple users, thereby improving efficiently the multi-user access communication performance and implementing multi-user overload access communication and/or multi-user grant-free access communication.

In order to enable those skilled in the art to understand the scheme provided by embodiments of the present disclosure more clearly, the data transmission method in accordance with an embodiment of the present disclosure will be described in detail through embodiments. The data transmission apparatus in accordance with an embodiment of the present disclosure is provided in all the transmitters in the following embodiments. It can be understand that all the transmitters in the following embodiments can implement functions of the data transmission apparatus.

The First Embodiment

Figure 3:
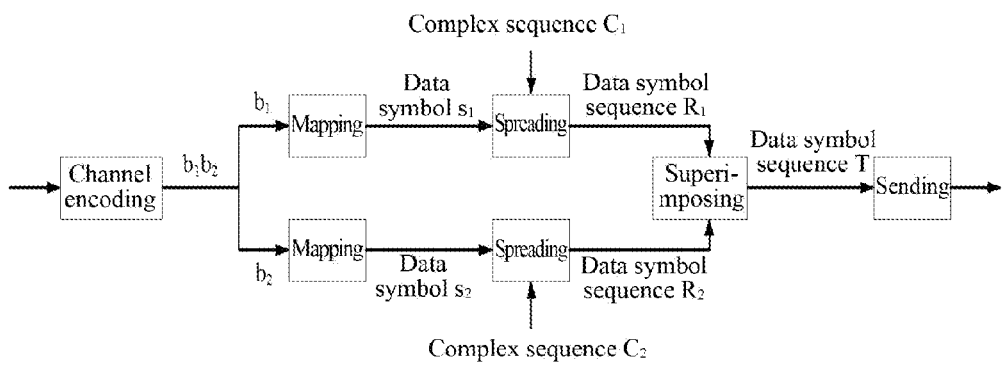
FIG. 3 is a schematic diagram of a process in which a transmitter transmits data in a first embodiment of the present disclosure.
Figure 4:
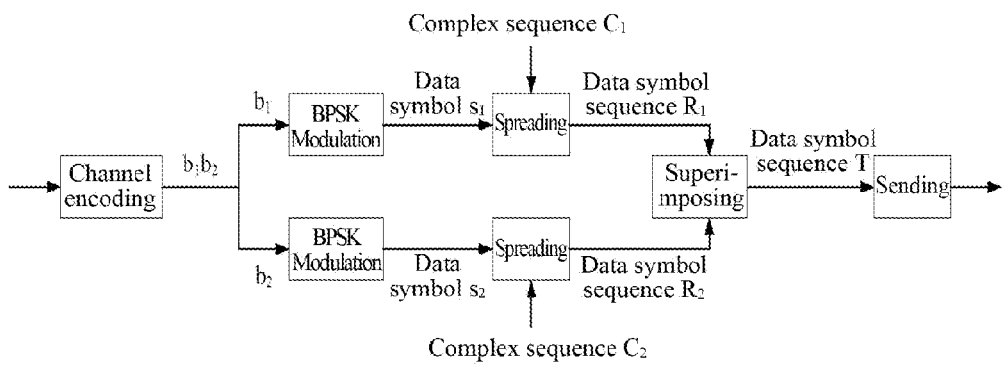
FIG. 4 is another schematic diagram of the process in which the transmitter transmits the data in the first embodiment of the present disclosure.
Figure 5:
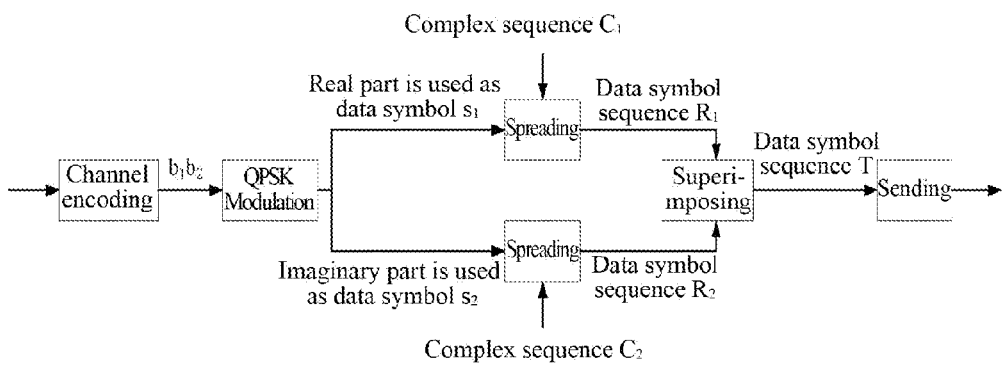
FIG. 5 is another schematic diagram of the process in which the transmitter transmits the data in the first embodiment of the present disclosure.
Figure 6:
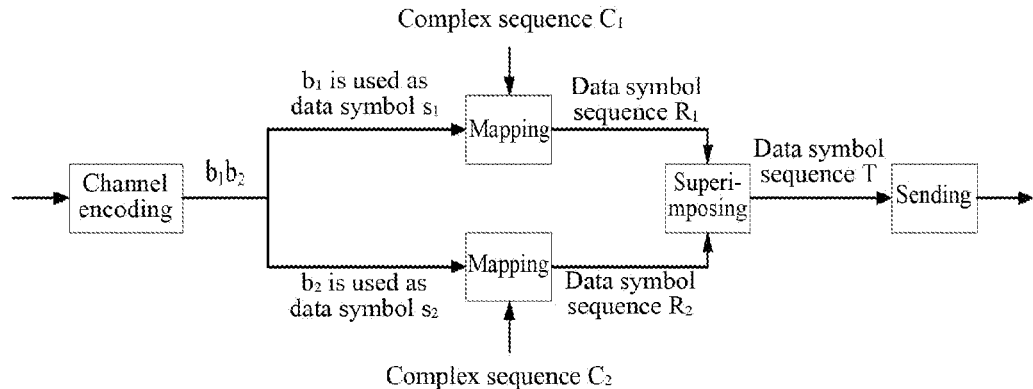
FIG. 6 is another schematic diagram of the process in which the transmitter transmits the data in the first embodiment of the present disclosure.

In this embodiment, assuming that N is equal to 2, the transmitter may obtain first 2 data symbols to be sent by the following way:

(1) as shown in FIG. 3, 2 data bits $b_1 b_2$ output by a channel encoder are mapped according to a predefined mapping rule respectively (e.g., when the value of the data bit is "0", the data bit is mapped as a data symbol "1", and when the value of the data bit is "1", the data bit is mapped as a data symbol "−1") to obtain 2 data symbols $s_1$ and $s_2$ as 2 data symbols to be sent. Or (2) as shown in FIG. 4, binary phase shift keying (BPSK) modulation is performed on 2 data bits $b_1 b_2$ output by the channel encoder respectively to obtain 2 data symbols $s_1$ and $s_2$ as 2 data symbols to be sent. Or (3) as shown in FIG. 5, quadrature phase shift keying (QPSK) modulation is performed on 2 data bits $b_1 b_2$ output by the channel encoder respectively to obtain one data symbol, and real part data of the data symbol is used as a data symbol $s_1$ to be sent and imaginary part data of the data symbol is used as a data symbol $s_2$ to be sent. Or (4) as shown in FIG. 6, each of 2 data bits $b_1 b_2$ output by the channel encoder is used as one data symbol to obtain 2 data symbols $s_1$ and $s_2$ as 2 data symbols to be sent.

It should be noted that the transmitter can further process multiple (more than 2) data bits output by the channel encoder in a manner similar to that described above to obtain 2 data symbols to be sent. For example, QPSK modulation is performed on every 2 data bits in 4 data bits output by the channel encoder to obtain 2 data symbols as 2 data symbols to be sent, or 16QAM modulation is performed on the 4 data bits output by the channel encoder to obtain one data symbol, and real part data and imaginary part data of the data symbol are used as 2 data symbols to be sent.

It should be noted that the above BPSK modulation may be implemented in the amplitude modulation or phase modulation mode, and the QPSK modulation may be implemented in the phase modulation mode, and the 16QAM modulation may be implemented in the amplitude and phase modulation mode. In addition, the mapping according to the predefined mapping rule may further include constellation mapping or coordinate mapping.

Then, the transmitter may determine 2 complex sequences $C_1$ and $C_2$ to be used, a way for determining includes:

(1) the 2 complex sequences to be used are determined according to a fixed configuration of a system. For example, the system configures fixedly the 2 complex sequences to be used by the transmitter, and the transmitter determines the 2 complex sequences to be used by it according to the configuration. Or (2) the 2 complex sequences to be used are determined by using a manner of randomly generating. For example, the transmitter determines the 2 complex sequences to be used by it through its random sequence generator. Or (3) the 2 complex sequences to be used are determined according to signaling sent by the system. For example, the system configures semi-statically or dynamically the 2 complex sequences to be used by the transmitter through the signaling. Or (4) the 2 complex sequences to be used are determined according to identification information of the transmitter. For example, the transmitter determines an initial status of its random sequence generator based on its identification information, such as serial number, identification code, position (such as geographical coordinates) and network address (such as Internet protocol (IP) address or medium access control (MAC) address) according to a rule preset by the system, and generates randomly the 2 complex sequences to be used. Or the transmitter determines the 2 complex sequences to be used according to sequence masks or sequence indexes composed of its identification information. Or (5) the 2 complex sequences to be used are determined according to data transmission resources. For example, the transmitter determines the initial status of its random sequence generator based on the used data transmission resources according to the rule preset by the system, and generates randomly the 2 complex sequences to be used. Or (6) the 2 complex sequences to be used are determined from a preset set of complex sequences according to the fixed configuration of the system. For example, the system configures fixedly indexes of the 2 complex sequences to be used by the transmitter, and the transmitter determines the 2 complex sequences to be used by it from the preset set of complex sequences according to the indexes. Or (7) the 2 complex sequences to be used are determined from the preset set of complex sequences by using a manner of randomly selecting. For example, the transmitter generates the indexes of the 2 complex sequences to be used by it through its random number generator, and determines the 2 complex sequences to be used by it from the preset set of complex sequences according to the indexes. Or (8) the 2 complex sequences to be used are determined from the preset set of complex sequences according to the signaling sent by the system. For example, the system configures semi-statically or dynamically the indexes of the 2 complex sequences to be used by the transmitter through the signaling, and the transmitter determines the 2 complex sequences to be used by it from the preset set of complex sequences according to the indexes. Or (9) the 2 complex sequences to be used are determined from the preset set of complex sequences according to the identification information of the transmitter. For example, the transmitter determines the indexes of the 2 complex sequences to be used by it based on its identification information, such as serial number, identification code, position and network address, and determines the 2 complex sequences to be used by it from the preset set of complex sequences according to the indexes. For example, assuming that the serial number of the transmitter is A, the transmitter can determine the indexes of the 2 complex sequences to be used by it to be 2A and 2A+1. Or

(10) the 2 complex sequences to be used are determined from the preset set of complex sequences according to the 2 data symbols. For example, the transmitter obtains the preset set of complex sequences associated with the 2 data symbols respectively, and determines one complex sequence corresponding to each of the data symbols from the preset set of complex sequences according to a correspondence between each of the data symbols and complex sequences in the associated preset set of complex sequences to obtain 2 complex sequences as the 2 complex sequences to be used. Herein the preset set of complex sequences associated with each of the data symbols and the correspondence between each of the data symbols and the complex sequences in the associated preset set of complex sequences may be preset by the system or configured by the system through the signaling or indicated by the system implicitly. Or

(11) the 2 complex sequences to be used are determined from the preset set of complex sequences according to the data transmission resources. For example, the transmitter determines the preset set of complex sequences associated with the used data transmission resources according to a correlation between the data transmission resources and the set of complex sequences, and then determines the 2 complex sequences to be used from the preset set of complex sequences. Herein the correlation between the data transmission resources and the set of complex sequences may be preset by the system or configured by the system through the signaling or indicated by the system implicitly.

It should be noted that the data transmission resources are data transmission resources used when the transmitter transmits the data, which may include various types of data transmission resources, such as carriers, time slots, time-frequency resources and spatial domain resources, or may be in the form of transmission resource units, transmission resource blocks or transmission resource sets.

The preset set of complex sequences may be determined by one of the following ways:

(1) the transmitter performs determination according to the fixed configuration of the system. For example, the system presets or configures fixedly the set of complex sequences used by the transmitter. Or (2) the transmitter performs determination according to the signaling sent by the system. For example, the system configures semi-statically or dynamically the set of complex sequences used by the transmitter through the singling. Or (3) the transmitter performs determination from multiple sets of complex sequences according to the fixed configuration of the system. For example, the system configures fixedly indexes of the sets of complex sequences used by the transmitter. Or (4) the transmitter performs determination from the multiple sets of complex sequences according to the signaling sent by the system. For example, the system configures semi-statically or dynamically the indexes of the sets of complex sequences used by the transmitter through the signaling. Or (5) the transmitter performs determination from the multiple sets of complex sequences according to its identification information. For example, the transmitter determines the indexes of the sets of complex sequences used by it according to its identification information, such as serial number, identification code, position and network address. Or (6) the transmitter performs determination from the multiple sets of complex sequences according to the data transmission resources. For example, the transmitter determines the preset set of complex sequences associated with the used data transmission resources according to the correlation between the data transmission resources and the sets of the complex sequences.

It should be noted that the multiple sets of complex sequences may be preset by the system or configured by the system through signaling.

The 2 complex sequences determined by the transmitter may be 2 orthogonal complex sequences or 2 non-orthogonal complex sequences.

The length of the 2 complex sequences determined by the transmitter is L, each element of the sequence is a complex number, and values of both a real part and an imaginary part of each element of the sequence come from an M-ary set of real numbers, where L is an integer number greater than 1 and M is an integer number greater than or equal to 2. For example, when the value of M is 2, the values of the real part and the imaginary part of each element of the complex sequence come from a set $\{-1, 1\}$; when the value of M is 3, the values of the real part and the imaginary part of each element of the complex sequence come from a set $\{-1, 0, 1\}$. In addition, the transmitter can further multiply the 2 complex sequences determined by it by a preset coefficient (the preset coefficient herein may be a first preset coefficient or a second preset coefficient) for energy normalization processing.

Then, the transmitter uses the determined 2 complex sequences to process the obtained 2 data symbols respectively to generate 2 data symbol sequences. The processing method may include:

(1) The transmitter spreads the obtained 2 data symbols using corresponding complex sequences in the determined 2 complex sequences respectively. For example, as shown in FIGS. 3, 4 and 5, the transmitter spreads a data symbol $s_1$ using a complex sequence $C_1$ to generate a data symbol sequence $R_1$, and spreads a data symbol $s_2$ using a complex sequence $C_2$ to generate a data symbol sequence $R_2$. Or (2) The transmitter maps the obtained 2 data symbols as the corresponding complex sequences in the determined 2 complex sequences respectively. For example, as shown in FIG. 6, the transmitter maps the data symbol $s_1$ as the complex sequence $C_1$ to generate the data symbol sequence $R_1$, and maps the data symbol $s_2$ as the complex sequence $C_2$ to generate the data symbol sequence $R_2$. Here, the data symbol sequence $R_1$ is the same as the complex sequence $C_1$, and the data symbol sequence $R_2$ is the same as the complex sequence $C_2$.

And then, the transmitter superimposes the generated 2 data symbol sequences to generate a superimposed data symbol sequence T, as shown in FIGS. 3, 4, 5 and 6. The superimposing method may include:

(1) The transmitter adds up directly the 2 data symbol sequences $R_1$ and $R_2$. Or (2) The transmitter performs power adjustment processing on the 2 data symbol sequences respectively and then adds them up. For example, the transmitter performs power adjustment processing on the data symbol sequence $R_1$ according to a preset power adjustment amount $p_1$ to obtain a data symbol sequence $T_1$, performs power adjustment processing on the data symbol sequence $R_2$ according to a preset power adjustment amount $p_2$ to obtain a data symbol sequence $T_2$, and then adds them up to obtain the superimposed data symbol sequence T. Or (3) The transmitter performs amplitude adjustment processing on the 2 data symbol sequences respectively and then adds them up. For example, the transmitter performs amplitude adjustment processing on the data symbol sequence $R_1$ according to a preset amplitude adjustment amount $a_1$ to obtain the data symbol sequence $T_1$, performs amplitude adjustment processing on the data symbol sequence $R_2$ according to the preset amplitude adjustment amount $a_2$ to obtain the data symbol sequence $T_2$, and then adds them up to obtain the superimposed data symbol sequence T. Or (4) The transmitter performs phase rotation processing on the 2 data symbol sequences respectively and then adds them up. For example, the transmitter performs phase rotation processing on the data symbol sequence $R_1$ according to a preset phase rotation amount $q_1$ to obtain the data symbol sequence $T_1$, performs phase rotation processing on the data symbol sequence $R_2$ according to a preset phase rotation amount $q_2$ to obtain the data symbol sequence $T_2$, and then adds them up to obtain the superimposed data symbol sequence T. Or (5) The transmitter performs delay processing on the 2 data symbol sequences respectively and then adds them up. For example, the transmitter performs delay processing on the data symbol sequence $R_1$ according to a preset delay amount $d_1$ to obtain the data symbol sequence $T_1$, performs delay processing on the data symbol sequence $R_2$ according to a preset delay amount $d_2$ to obtain the data symbol sequence $T_2$, and then adds them up to obtain the superimposed data symbol sequence T.

The power adjustment amount, the amplitude adjustment amount, the phase rotation amount and the delay amount may be preset by the system or configured by the system through the signaling or indicated by the system implicitly or determined by the transmitter according to the preset rule. In addition, the power adjustment processing, the amplitude adjustment processing, the phase rotation processing and the delay processing may be implemented for part of the data symbol sequences only.

At last, the transmitter may send the superimposed data symbol sequence T by performing carrier modulation on the superimposed data symbol sequence T to form transmitting signals and send them out or by mapping the superimposed data symbol sequence T to preset data transmission resources to form transmitting signals and send them out.

On the basis of this embodiment, the transmitter can further process multiple (more than 2) data bits output by the channel encoder in a manner similar to that in this embodiment to obtain more than 2 data symbols to be sent, i.e., N is greater than 2. For example, BPSK modulation is performed on 4 data bits output by the channel encoder to obtain 4 data symbols as 4 data symbols to be sent. Or QPSK modulation is performed on every 2 data bits of the 4 data bits output by the channel encoder to obtain 2 data symbols, and real part data and imaginary part data of each of the data symbols are used as a data symbol respectively to obtain 4 data symbols as the 4 data symbols to be sent. Or QPSK modulation is performed on every 2 data bits of the 8 data bits output by the channel encoder to obtain 4 data symbols as the 4 data symbols to be sent. Then, the transmitter determines N complex sequences to be used, processes the obtained N data symbols using the determined N complex sequences respectively to generate N data symbol sequences, and superimposes the N data symbol sequences to obtain a superimposed data sequence to send. The processing thereof is similar to that described in this embodiment and will not be repeated here.

The transmitter superimposes the N data symbol sequences, and can divide the N data symbol sequences into multiple data symbol sequence groups, each data symbol sequence group includes at least two data symbol sequences. Then the transmitter adds up the at least two data symbol sequences in each of the data symbol sequence groups or performs power adjustment or amplitude adjustment or phase modulation or delay processing on the at least two data symbol sequences respectively and adds them up to obtain multiple superimposed data symbol sequences and sends them on the corresponding data transmission resources.

The Second Embodiment

Figure 7:
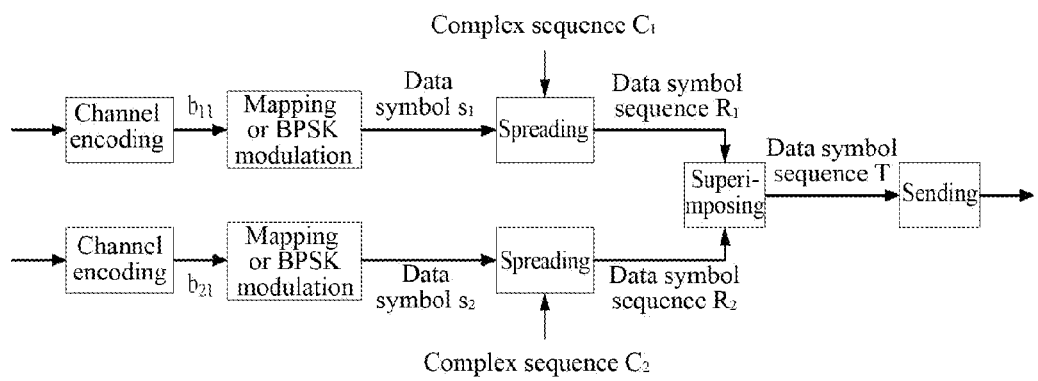
FIG. 7 is a schematic diagram of the process in which a transmitter transmits data in a second embodiment of the present disclosure.
Figure 8:
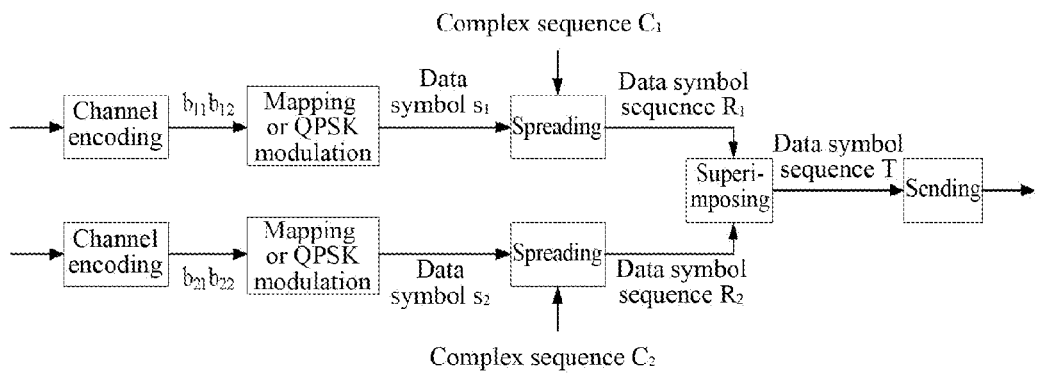
FIG. 8 is another schematic diagram of the process in which the transmitter transmits the data in the second embodiment of the present disclosure.
Figure 9:
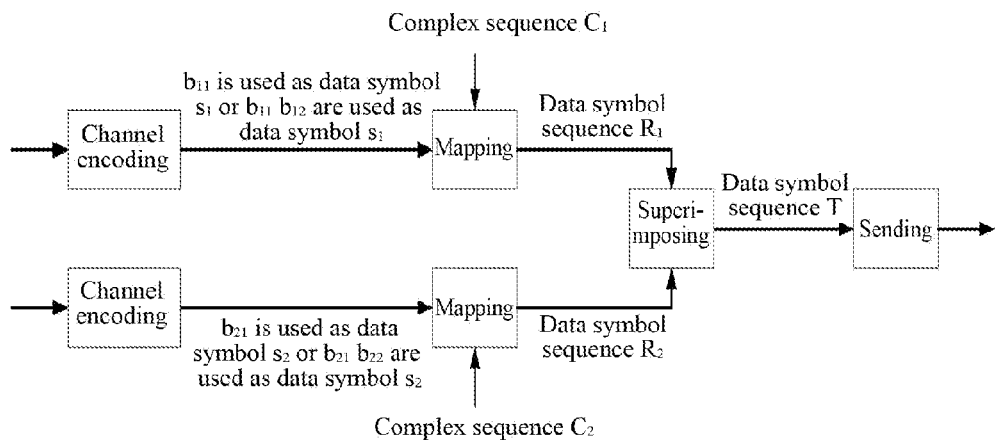
FIG. 9 is another schematic diagram of the process in which the transmitter transmits the data in the second embodiment of the present disclosure.

In this embodiment, assuming that N is equal to 2, the transmitter may obtain first 2 data symbols to be sent by the following way:

(1) as shown in FIG. 7, data bits $b_{11}$ and $b_{22}$ output by 2 channel encoders respectively are mapped according to a predefined mapping rule respectively (e.g., when the value of the data bit is "0", the data bit is mapped as a data symbol "1", and when the value of the data bit is "1", the data bit is mapped as a data symbol "−1") or BPSK modulation is performed on the data bits $b_{11}$ and $b_{22}$ respectively to obtain 2 data symbols $s_1$ and $s_2$ as 2 data symbols to be sent. Or (2) as shown in FIG. 8, 2 data bits $b_{11}b_{12}$ and $b_{21}b_{22}$ output by 2 channel encoders respectively are mapped according to the predefined mapping rule respectively (e.g., constellation mapping or coordinate mapping) or QPSK modulation is performed on the data bits $b_{11}b_{12}$ and $b_{21}b_{22}$ respectively to obtain 2 data symbols $s_1$ and $s_2$ as 2 data symbols to be sent; or (3) as shown in FIG. 9, data bits $b_{11}$ and $b_{22}$ output by 2 channel encoders respectively are used as a data symbol respectively or 2 data bits $b_{11}b_{12}$ and $b_{21}b_{22}$ output by 2 channel encoders respectively are used as a data symbol respectively to obtain 2 data symbols $s_1$ and $s_2$ as 2 data symbols to be sent.

The transmitter can further process multiple (more than 2) data bits output by the 2 channel encoders in a manner similar to that described above to obtain 2 data symbols to be sent. For example, amplitude and phase modulation is performed on 4 data bits output by the 2 channel encoders respectively in the 16QAM mode to obtain 1 data symbol respectively, i.e., 2 data symbols in total, which are used as 2 data symbols to be sent.

Then, the transmitter determines 2 complex sequences $C_1$ and $C_2$ to be used in the same manner as that in the first embodiment, which will be not repeated herein.

Then, the transmitter uses the determined 2 complex sequences to process the obtained 2 data symbols respectively to generate 2 data symbol sequences $R_1$ and $R_2$; the way for processing may include:

(1) The transmitter spreads the obtained 2 data symbols using corresponding complex sequences in the determined 2 complex sequences respectively. For example, as shown in FIGS. 7 and 8, the transmitter spreads a data symbol $s_1$ using a complex sequence $C_1$ to generate a data symbol sequence $R_1$, and spreads a data symbol $s_2$ using a complex sequence $C_2$ to generate a data symbol sequence $R_2$. Or (2) The transmitter maps the obtained 2 data symbols as the corresponding complex sequences in the determined 2 complex sequences respectively. For example, as shown in FIG. 9, the transmitter maps the data symbol $s_1$ as the complex sequence $C_1$ to generate the data symbol sequence $R_1$, and maps the data symbol $s_2$ as the complex sequence $C_2$ to generate the data symbol sequence $R_2$. Here, the data symbol sequence $R_1$ is the same as the complex sequence $C_1$, and the data symbol sequence $R_2$ is the same as the complex sequence $C_2$.

And then, the transmitter superimposes the generated 2 data symbol sequences to generate a superimposed data symbol sequence T. The way for superimposing is similar to that in the first embodiment, and will not be repeated herein.

At last, the transmitter sends the superimposed data symbol sequence T. The way for sending is similar to that in the first embodiment, and will not be repeated herein.

In this embodiment, the transmitter processes data bits output by two channel encoder respectively to obtain two data symbol sequences and superimpose them for transmission. Both streams of the data prior to the superimposition by the transmitter may be data sent by the transmitter itself, or one stream may be data sent by the transmitter itself, and the other stream may be data sent by other transmitters with the assistance of the transmitter, or both streams of the data may be data sent by other transmitters with the assistance of the transmitter. The latter two cases may be applied to the scenes such as relay communication and device to device (D2D) communication.

On the basis of this embodiment, the transmitter can further process one or more data bits output by multiple channel encoders respectively in a manner similar to that in this embodiment to obtain more than 2 data symbols to be sent, i.e., N is greater than 2. For example, BPSK modulation is performed on 1 data bit output by each of the 4 channel encoders respectively to obtain 4 data symbols as 4 data symbols to be sent. Or QPSK modulation is performed on 2 data bits output by each of the 4 channel encoders respectively to obtain 4 data symbols as 4 data symbols to be sent. Then, the transmitter determines N complex sequences to be used, processes the obtained N data symbols using the determined N complex sequences respectively to generate N data symbol sequences, and superimposes the N data symbol sequences to obtain a superimposed data sequence to send. The processing thereof is similar to that described in this embodiment and will not be repeated herein.

Figure 10:
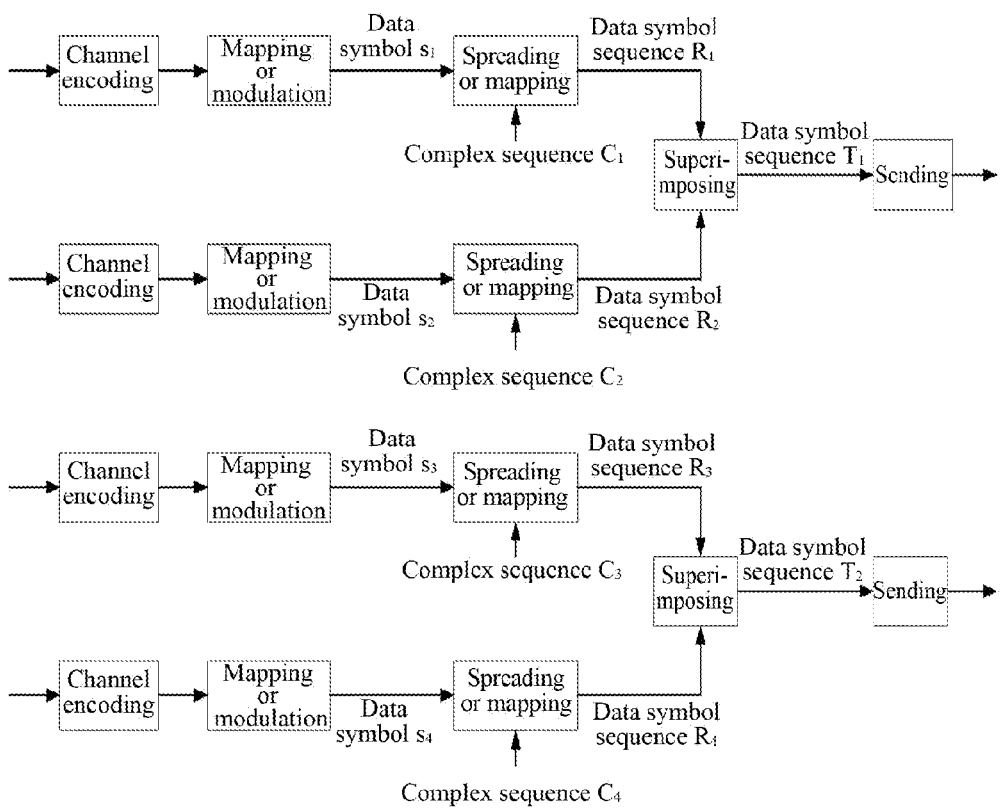
FIG. 10 is another schematic diagram of the process in which the transmitter transmits the data in the second embodiment of the present disclosure.

The transmitter superimposes the N data symbol sequences, and can divide the N data symbol sequences into multiple data symbol sequence groups, each data symbol sequence group includes one or more data symbol sequences. And then the transmitter adds up the data symbol sequences in each of the data symbol sequence groups or performs power adjustment or amplitude adjustment or phase modulation or delay processing on the data symbol sequences respectively and adds them up to obtain multiple the superimposed data symbol sequences and sends them on the corresponding data transmission resources. As shown in FIG. 10, the transmitter generates 4 data symbol sequences $R_1$, $R_2$, $R_3$, $R_4$, divides the 4 data symbol sequences into 2 data symbol sequence groups, each data symbol sequence group includes 2 data symbol sequences, i.e., the data symbol sequences $R_1$ and $R_2$ are used as a data symbol sequence group, and the data symbol sequences $R_3$ and $R_4$ are used as a data symbol sequence group. And then the transmitter adds up the data symbol sequences in each of the data symbol sequence groups to obtain 2 superimposed data symbol sequences $T_1$ and $T_2$, finally the transmitter forms the 2 superimposed data symbol sequences $T_1$ and $T_2$ into transmitting signals on their respective data transmission resources and sends them out.

The Third Embodiment

In this embodiment, K transmitters transmit data on the same data transmission resources simultaneously.

Each of the transmitters obtains N data symbols to be sent, determines N complex sequences to be used, then processes the obtained N data symbols respectively using the determined N complex sequences to generate N data symbol sequences, and superimposes the N data symbol sequences to obtain and send a superimposed data symbol sequence.

The K transmitters use the same data transmission resources (such as time-frequency resources) while transmitting the data. After being propagated through a wireless channel, a superimposed signal of the signals transmitted by the K transmitters will be received by a receiver.

When the receiver is receiving and detecting the data, because the K transmitters transmit the data on the same data transmission resources, the receiver can detect the data sent by each of the transmitters using an interference cancellation signal detection method (such as successive interference cancellation (SIC)) according to the N complex sequences used by each of the transmitters.

Because the values of both the real part and the imaginary part of each element of the used complex sequences in the embodiments of the present disclosure come from an M-ary set of real numbers, it may be ensured efficiently that K transmitters using the same data transmission resources select the complex sequences with low cross correlation to process and send their data symbols to be sent, thereby controlling the interference between multiple users and supporting the larger number of access users. Meanwhile, compared with the existing technology, the embodiments of the present disclosure may use the complex sequences of shorter length, thereby controlling efficiently the reception and detection complexity of the receiver. Therefore, the embodiments of the present disclosure may control efficiently the interference between multiple users and control efficiently the reception and detection complexity of the receiver, thereby improving the multi-user access communication performance and implementing multi-user overload access communication and/or multi-user grant-free access communication.

Finally, it is worth mentioning that all the embodiments described above may be applied to MC-CDMA systems, a competition access scene or a grant-free access scene in applications. In the case of application to the MC-CDMA, the interference between multiple users and reception and detection complexity may be controlled efficiently in conjunction with the receiver using an interference cancellation signal detector, thereby improving efficiently the multi-user access communication performance and implementing multi-user overload access communication. In the case of application to the competition access scene, multiple or even a large number of user terminals may request to access to the system simultaneously, thereby improving efficiently access efficiency of the system. And in the case of application to the grant-free access scene, once the user terminals want to transmit data, the user terminals can send the data, multiple users can use the same data transmission resources for data transmission simultaneously, thereby reducing scheduling signaling of the system, decreasing access delay of the terminals and implementing grant-free access and communication of the multiple user terminals.

The apparatus embodiment described above is exemplary only. For example, the division of the modules is only a logical function division, and there may be other division modes in practical implementation. Additionally, connections between the modules shown or discussed may be implemented through some interfaces electronically, mechanically or in other forms. The modules may be or may be not separated physically, and may be or may be not physical units. Part or all of the modules may be selected according to actual requirements to implement the object of the scheme of the embodiments.

In addition, various function units in the embodiments of the present disclosure may be integrated all into one processing module, or each of the modules may be included physically separately, or two or more than two modules may be integrated into one module. The integrated modules may be implemented in a form of hardware or a form of hardware plus software function modules.

The integrated modules implemented in the form of software function units may be stored in a computer readable storage medium. The software function modules stored in a storage medium include several instructions used to enable a computer device (which may be a personal computer, a server or a network device) to execute part of the steps of the method in accordance with the embodiment of the present disclosure. The storage medium described previously includes a medium which can storage program codes, such as a U-disk, a removable hard disk, a read-only memory (ROM), a random access memory (RAM), a magnetic disk or optical disk.

People having ordinary skill in the art may understand that all or part of steps in the embodiments described above can be carried out using computer programs, which can be stored in a computer readable storage medium. The computer programs, when executed on the corresponding hardware platform (such as system, device, apparatus and component), include one or a combination of steps in the method embodiments.

Optionally, all or part of steps in the embodiments described above can be carried out using integrated circuits. These steps can be implemented by making them one by one into individual integrated circuit modules or by making multiple modules thereof into a single integrated circuit module.

Various apparatuses/functional modules/functional units in the embodiments described above can be implemented by using general computing apparatuses, and can be centralized on a single computing apparatus or distributed across a network formed by multiple computing apparatus.

Various apparatuses/functional modules/functional units in the embodiments described above, when implemented in a form of software functional module and sold or used as stand-stone products, can be stored in a computer readable storage medium. The computer readable storage medium mentioned above may be a read-only memory, a magnetic disk or optical disk.

INDUSTRIAL APPLICABILITY

The embodiments of the present disclosure can use complex sequences of shorter length to control efficiently the reception and detection complex of the receiver and interference between multiple users, thereby improving efficiently the multi-user access communication performance and implementing multi-user overload access communication and/or multi-user grant-free access communication.

What is claimed is:

1. A data transmission method, comprising:
obtaining N data symbols to be sent;
determining N complex sequences to be used;
processing the N data symbols using the N complex sequences respectively to generate N data symbol sequences;
superimposing the N data symbol sequences to generate a superimposed data symbol sequence; and
sending the superimposed data symbol sequence;
wherein N is an integer number greater than or equal to 2;
wherein a length of the complex sequence is L, each element of the complex sequence is a complex number, and values of both a real part and an imaginary part of each element of the complex sequence come from an M-ary set of real numbers, wherein L is an integer number greater than 1 and M is an integer number greater than 2;
wherein the M-ary set of real numbers comprises:
a set consisting of M different integer numbers within a range $[-(M-1)/2, (M-1)/2]$ when M is an odd number greater than 2; or
a set consisting of M different odd numbers within a range $[-(M-1), (M-1)]$ when M is an even number greater than 2; or
a set consisting of M real numbers obtained by multiplying M different integer numbers within a range $[-(M-1)/2, (M-1)/2]$ by a first preset coefficient respectively when M is an odd number greater than 2; or
a set consisting of M real numbers obtained by multiplying M different odd numbers within a range $[-(M-1), (M-1)]$ by a second preset coefficient respectively when M is an even number greater than 2.

2. The method according to claim 1, wherein obtaining the N data symbols to be sent comprises:
performing a first preset processing on X data bits to obtain the N data symbols to be sent; or
using real part data and imaginary part data of Y data symbols obtained by performing a second preset processing on the X data bits as the N data symbols to be sent, wherein N=2Y, and Y is an integer number greater than or equal to 1;
wherein X is an integer number greater than or equal to N.

3. The method according to claim 2, wherein the first preset processing or the second preset processing comprises:
mapping according to a predefined mapping rule; or
amplitude and/or phase modulation; or
using every k data bits as one data symbol, wherein k is an integer number greater than or equal to 1.

4. The method according to claim 1, wherein the N complex sequences are:
N complex sequences orthogonal to each other; or N non-orthogonal complex sequences.

5. The method according to claim 1, wherein determining the N complex sequences to be used comprises:
determining the N complex sequences to be used according to a fixed configuration of a system; or
determining the N complex sequences to be used by using a manner of randomly generating; or
determining the N complex sequences to be used according to signaling sent by a system; or
determining the N complex sequences to be used according to identification information of a transmitter; or
determining the N complex sequences to be used according to data transmission resources; or
determining the N complex sequences to be used from a preset set of complex sequences according to the fixed configuration of the system; or
determining the N complex sequences to be used from the preset set of complex sequences by using a manner of randomly selecting; or
determining the N complex sequences to be used from the preset set of complex sequences according to the signaling sent by the system; or
determining the N complex sequences to be used from the preset set of complex sequences according to the identification information of the transmitter; or
determining the N complex sequences to be used from the preset set of complex sequences according to the N data symbols; or
determining the N complex sequences to be used from the preset set of complex sequences according to the data transmission resources.

6. The method according to claim 5, wherein the preset set of complex sequences is determined according to the fixed configuration of the system; or the preset set of complex sequences is determined according to the signaling sent by the system; or the preset set of complex sequences is determined from Q sets of complex sequences according to the fixed configuration of the system; or the preset set of complex sequences is determined from the Q sets of complex sequences according to the signaling sent by the system; or the preset set of complex sequences is determined from the Q sets of complex sequences according to the identification information of the transmitter; or the preset set of complex sequences is determined from the Q sets of complex sequences according to the data transmission resources; wherein Q is an integer number not less than 1.

7. The method according to claim 6, wherein the identification information of the transmitter comprises at least one of the following: a serial number of the transmitter, an identification code of the transmitter, position information of the transmitter, and a network address of the transmitter.

8. The method according to claim 1, wherein superimposing the N data symbol sequences comprises:
adding up the N data symbol sequences or performing preset processing on the N data symbol sequences respectively and then adding up the processed N data symbol sequences; or
obtaining a plurality of data symbol sequence groups according to the N data symbol sequences, wherein each of the data symbol sequence groups contains at least two data symbol sequences; and adding up the at least two data symbol sequences in each of the data symbol sequence groups or performing the preset processing on the at least two data symbol sequences in each of the data symbol sequence groups respectively and then adding up the processed at least two data symbol sequences.

9. The method according to claim 8, wherein the preset processing comprises power adjustment, amplitude adjustment, phase rotation or delay processing.

10. The method according to claim 1, wherein sending the superimposed data symbol sequence comprises:
forming and sending transmitting signals on the data transmission resources for the superimposed data symbol sequence.

11. A non-transitory computer readable storage medium, storing computer executable instructions which are used for executing the method according to claim 1.

12. The method according to claim 1, wherein processing the N data symbols using the N complex sequences respectively comprises:
mapping one data symbol as one complex sequence whose length is L.

13. A data transmission apparatus, comprising:
a processor; and
a non-transitory computer readable medium comprising program codes that, when executed on the processor, cause the processor to:
obtain N data symbols to be sent;
determine N complex sequences to be used;
process the N data symbols using the N complex sequences respectively to generate N data symbol sequences;
superimpose the N data symbol sequences to generate a superimposed data symbol sequence; and
send the superimposed data symbol sequence;
wherein N is an integer number greater than or equal to 2;
wherein a length of the complex sequence is L, each element of the complex sequence is a complex number, and values of both a real part and an imaginary part of each element of the complex sequence come from an M-ary set of real numbers, wherein L is an integer number greater than 1 and M is an integer number greater than 2;
wherein the M-ary set of real numbers comprises:
a set consisting of M different integer numbers within a range $[-(M-1)/2, (M-1)/2]$ when M is an odd number greater than 2; wherein the M integer numbers are different from each other; or
a set consisting of M different odd numbers within a range $[-(M-1), (M-1)]$ when M is an even number greater than 2; or
a set consisting of M real numbers obtained by multiplying M different integer numbers within a range $[-(M-1)/2, (M-1)/2]$ by a first preset coefficient respectively when M is an odd number greater than 2; or
a set consisting of M real numbers obtained by multiplying M different odd numbers within a range $[-(M-1), (M-1)]$ by a second preset coefficient respectively when M is an even number greater than 2.

* * * * *